United States Patent
Ishitsuka et al.

(10) Patent No.: US 10,737,966 B2
(45) Date of Patent: Aug. 11, 2020

(54) METHOD FOR PREPARING SYNTHETIC QUARTZ GLASS SUBSTRATE

(71) Applicant: Shin-Etsu Chemical Co., Ltd., Tokyo (JP)

(72) Inventors: Yoko Ishitsuka, Joetsu (JP); Atsushi Watabe, Joetsu (JP); Daijitsu Harada, Joetsu (JP); Masaki Takeuchi, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/452,910

(22) Filed: Mar. 8, 2017

(65) Prior Publication Data

US 2017/0260081 A1 Sep. 14, 2017

(30) Foreign Application Priority Data

Mar. 9, 2016 (JP) .................................. 2016-045211

(51) Int. Cl.
*C03B 33/02* (2006.01)
*G01B 11/06* (2006.01)
(Continued)

(52) U.S. Cl.
CPC ................ *C03B 33/02* (2013.01); *B28D 5/00* (2013.01); *C03C 3/06* (2013.01); *C03C 15/00* (2013.01);
(Continued)

(58) Field of Classification Search
CPC ............ C03B 33/02–0855; C03C 3/06; G03F 7/70966; B28D 5/00–047; G01N 21/23; G01M 11/02–04
See application file for complete search history.

(56) References Cited

U.S. PATENT DOCUMENTS 7,552,601 B2 6/2009 Kühn et al.
8,357,939 B2 1/2013 Nakai
(Continued)

FOREIGN PATENT DOCUMENTS

EP 1 586 544 A1 10/2005
EP 1764689 A1 2/2007
(Continued)

OTHER PUBLICATIONS

Budhlall, High Refractive Index Immersion Fluids for 193nm Immersion, Lithography Optical Microlithography XVIII, edited by Bruce W. Smith, Proceedings of SPIE vol. 5754 (SPIE, Bellingham, WA, 2005).*

(Continued)

*Primary Examiner* — Alex A Rolland
(74) *Attorney, Agent, or Firm* — Birch, Stewart, Kolasch & Birch, LLP

(57) ABSTRACT

Synthetic quartz glass substrates are prepared by furnishing a synthetic quartz glass block, coating two opposed surfaces of the glass block with a liquid having a transmittance of at least 99.0%/mm at a birefringence measuring wavelength, measuring a birefringence of the glass block by directing light thereacross, determining a slice thickness on the basis of the birefringence measurement and the dimensions of the substrate, and slicing the glass block at the determined slice thickness.

7 Claims, 1 Drawing Sheet

(51) Int. Cl.
*B28D 5/00* (2006.01)
*C03C 3/06* (2006.01)
*C03C 15/00* (2006.01)
*C03C 17/28* (2006.01)
*G01N 21/23* (2006.01)

(52) U.S. Cl.
CPC .............. *C03C 17/28* (2013.01); *G01B 11/06* (2013.01); *C03C 2201/02* (2013.01); *C03C 2203/50* (2013.01); *C03C 2218/114* (2013.01); *C03C 2218/32* (2013.01); *G01N 21/23* (2013.01)

(56) References Cited

U.S. PATENT DOCUMENTS

| | | |
|---|---|---|
| 2008/0292882 A1 | 11/2008 | Agata et al. |
| 2009/0103105 A1* | 4/2009 | Schoenfeld ........ G01M 11/0235 356/515 |
| 2010/0103420 A1* | 4/2010 | Pahl ................... G01M 11/0228 356/365 |
| 2014/0102355 A1* | 4/2014 | Fiolka ...................... G02B 1/08 117/4 |
| 2014/0120198 A1* | 5/2014 | Harada ................ B29C 59/022 425/385 |

FOREIGN PATENT DOCUMENTS

| | | |
|---|---|---|
| EP | 2 345 753 A1 | 7/2011 |
| EP | 2955503 A1 | 12/2015 |
| JP | 2005-289801 A | 10/2005 |
| JP | 2011-155258 A | 8/2011 |

OTHER PUBLICATIONS

Extended European Search Report, dated Jul. 7, 2017, for European Application No. 17159011.0.

\* cited by examiner

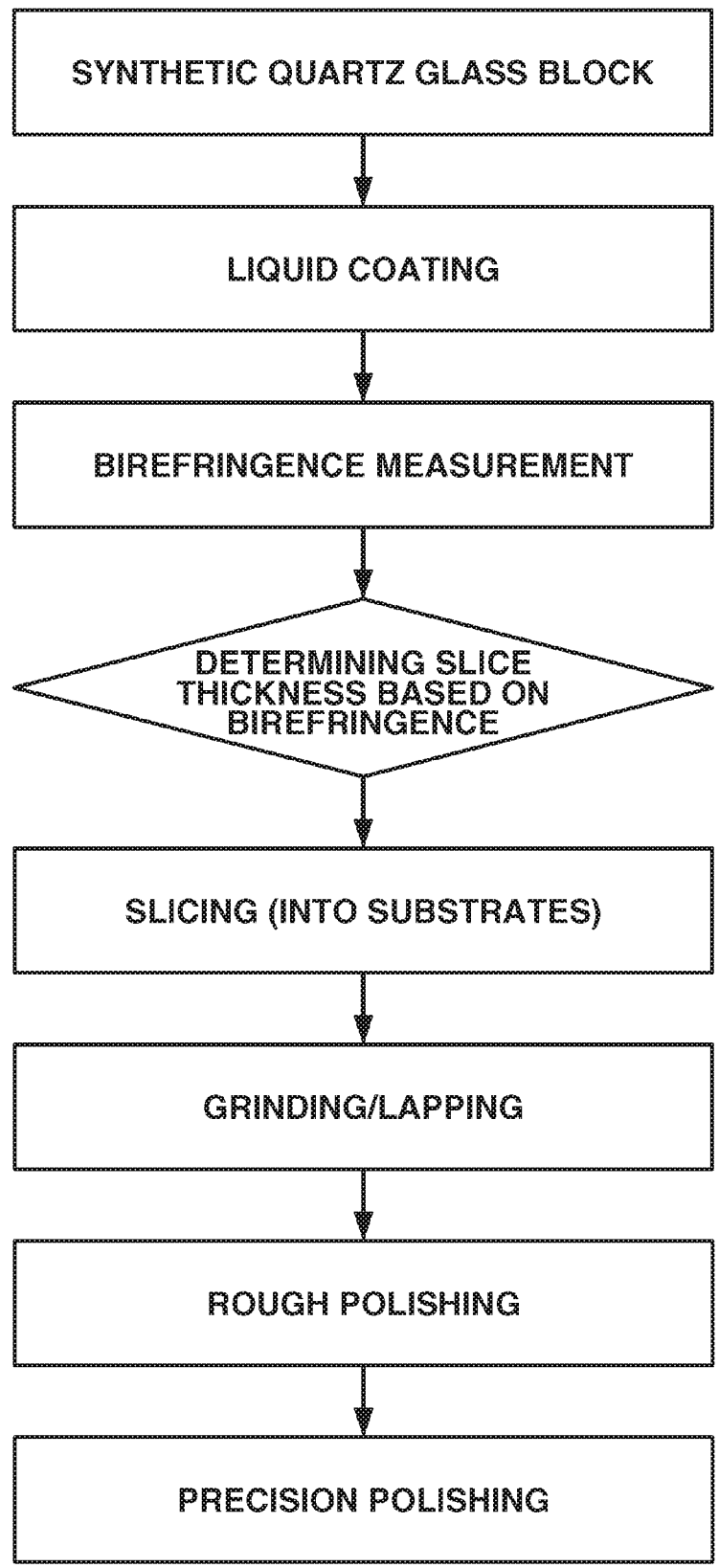

METHOD FOR PREPARING SYNTHETIC QUARTZ GLASS SUBSTRATE

CROSS-REFERENCE TO RELATED APPLICATION

This non-provisional application claims priority under 35 U.S.C. § 119(a) on Patent Application No. 2016-045211 filed in Japan on Mar. 9, 2016, the entire contents of which are hereby incorporated by reference.

TECHNICAL FIELD

This invention relates to a method for preparing synthetic quartz glass substrates while minimizing a loss of material during the polishing step.

BACKGROUND ART

In general, large-sized synthetic quartz glass substrates are prepared by furnishing a synthetic quartz glass block, slicing the glass block into plates by means of a slicing machine such as wire saw, lapping the quartz glass plates with a slurry containing abrasive grains, and subsequently polishing the plates until the desired size, thickness and flatness are reached.

If plate-shaped synthetic glass substrates as sliced by the slicing step are noticeably warped, the subsequent polishing step is required to meet that the substrate surface reaches a flatness within the predetermined range, to eliminate the warpage (or sori) of the substrate, and to maintain the overall thickness distribution within a certain range. Where the surface precision as sliced is constant, the necessary polishing allowance becomes larger as the warpage (or sori) is larger.

Then, the thickness of substrates into which the glass block is sliced is equal to the final target thickness plus the necessary allowance of the polishing step. If the magnitude of warpage (or sori) of substrates induced after slicing is not estimatable, then slicing must be done at an extra thickness including a certain margin. As a result, an extra polishing allowance is incurred for thickness adjustment during the subsequent polishing step, leading to losses of stock material and step time.

Highly flat substrates with minimal warpage are prepared, for example, by heat treating a substrate as sliced to deform it to mitigate warpage (or sori) and then polishing the substrate as disclosed in Patent Document 1, or by previously heat treating a block so that ingot-originating strains are concentrated in a peripheral portion thereof, removing the peripheral portion, and using the remaining block as stock material as disclosed in Patent Document 2.

CITATION LIST

Patent Document 1: JP-A 2011-155258
   (U.S. Pat. No. 8,357,939, EP 2345753)
Patent Document 2: JP-A 2005-289801
   (U.S. Pat. No. 7,552,601, EP 1586544)

SUMMARY OF INVENTION

The heat treatment of substrates in Patent Document 1 is effective for substrates of relatively small size, e.g., a diameter of about 200 mm, but not for substrates of large size because of difficulty to temperature control overall substrates, time-consuming heating and cooling steps, and a large-scale treatment system. The method of removing a substantially strained portion from an ingot as disclosed in Patent Document 2 has the drawback that the volume of removed portion becomes a loss.

An object of the invention is to provide a method for preparing synthetic quartz glass substrates in a profitable manner, comprising the steps of estimating the magnitude of warpage after slicing from the birefringence measurement of a synthetic quartz glass block as stock material, and determining a polishing allowance necessary upon flattening, thereby reducing a loss which will arise in the subsequent polishing step.

The inventors have found that synthetic glass substrates can be prepared in a productive, economically acceptable manner by measuring a birefringence of a synthetic quartz glass block as stock material, determining from the birefringence measurement, a polishing allowance having the magnitude of warpage after slicing taken into account, for thereby reducing any loss which will arise in the subsequent polishing step.

In one aspect, the invention provides a method for preparing a synthetic quartz glass substrate, comprising the steps of:

furnishing a synthetic quartz glass block to be sliced into synthetic quartz glass substrates, the glass block having a surface parallel to a slicing plane and a surface opposed thereto, coating the opposed surfaces of the glass block with a liquid having a transmittance of at least 99.0%/mm at a birefringence measuring wavelength, measuring a birefringence of the glass block by directing light so as to enter one coated surface and emerge from the other coated surface, determining a slice thickness to which the glass block is sliced, on the basis of the birefringence measurement and the dimensions of the substrate, and slicing the glass block at the determined slice thickness into synthetic quartz glass substrates.

In a preferred embodiment wherein the substrate has dimensions of 300 mm to less than 900 mm×300 mm to less than 900 mm×α mm thickness, when the glass block has a birefringence measurement of 0 nm/cm to less than 30 nm/cm, the slice thickness is set $(\alpha+0.02\alpha)$ to $(\alpha+0.04\alpha)$ mm, and when the glass block has a birefringence measurement of 30 nm/cm to 50 nm/cm, the slice thickness is set $(\alpha+0.03\alpha)$ to $(\alpha+0.05\alpha)$ mm.

In another preferred embodiment wherein the substrate has dimensions of 900 mm to less than 1,800 mm×900 mm to less than 1,800 mm×α mm thickness, when the glass block has a birefringence measurement of 0 nm/cm to less than 20 nm/cm, the slice thickness is set $(\alpha+0.02\alpha)$ to $(\alpha+0.04\alpha)$ mm, and when the glass block has a birefringence measurement of 20 nm/cm to 40 nm/cm, the slice thickness is set $(\alpha+0.03\alpha)$ to $(\alpha+0.05\alpha)$ mm.

The method may further comprise, after the slicing step, the steps of grinding or lapping, rough polishing, and precision polishing the synthetic quartz glass substrates.

Advantageous Effects of Invention

While the synthetic quartz glass substrate preparation method includes a slicing step at early stage and a polishing step at later stage, according to the invention, an allowance necessary in the polishing step is estimated prior to the slicing step, and the slice thickness is determined from the allowance. This reduces any loss of a synthetic quartz glass block as stock material which will arise in the polishing step.

Thus synthetic quartz glass substrates can be prepared in a productive and economic manner.

BRIEF DESCRIPTION OF DRAWINGS

FIG. 1 is a flow diagram illustrating one exemplary method for preparing a synthetic quartz glass substrate according to the invention.

DESCRIPTION OF PREFERRED EMBODIMENTS

Referring to the flow diagram of FIG. 1, the method of the invention is described in detail. The method starts with a synthetic quartz glass block, which may be produced by subjecting a source silica compound such as silane or siloxane compound to vapor phase hydrolysis or oxidative decomposition with oxyhydrogen flame, depositing silica fine particles on a target to form a synthetic quartz glass block, and holding the glass block within a mold of high-purity carbon in a vacuum melting furnace at a temperature of 1,700 to 1,900° C. for 30 to 120 minutes for thereby hot shaping the glass block into a synthetic quartz glass block of desired shape. The process may be either the direct process of depositing silica fine particles on a target and simultaneously melting and vitrifying the particles, or the indirect process of depositing silica fine particles on a target and subsequently vitrifying the particles into transparent glass.

The synthetic quartz glass block may have any desired shape such as quadrangle, rectangle, square or circle while it is preferably dimensioned to a diameter or length/width of 300 to 1,800 mm and a thickness of 10 to 200 mm. The glass block has a pair of major surfaces, a surface parallel to a slicing plane along which the glass block is sliced into a substrate and a surface opposed thereto.

Next, a liquid is coated to the opposed surfaces of the glass block for measurement of a birefringence. The surface of the glass block to be coated with the liquid is preferably such a rough surface that once the surface is coated with the liquid, light is transmitted by that surface. Specifically, the glass block surface to be coated with the liquid has a roughness (Sa) of preferably up to 1 mm, more preferably 0.01 μm<Sa≤1 mm, more preferably 0.1 μm<Sa≤100 μm, and even more preferably 0.5 μm<Sa≤50 μm. A surface roughness of less than 0.01 μm indicates an approximately mirror surface which is light transmissive without a need for liquid coating, and then the coating of a liquid for enabling light transmission is meaningless. If a surface has a roughness (Sa)>1 mm, not all surface asperities are buried by liquid coating, suggesting more or less influence of surface topography, that is, a possibility that accurate measurement of birefringence is prohibited by diffuse reflection on the incident and emergent surfaces.

The roughness of a surface to be coated with a liquid may be measured by means of a contact type meter such as an atomic force microscope (AFM) or probe type roughness meter or a non-contact type meter such as a laser interferometer or while light interferometer. In the case of measurement on two-dimensional plane, the range of measurement is preferably from 1 μm squares to 1 mm squares, more preferably from 10 μm squares to 100 μm squares. In the case of measurement on one-dimensional length, the measurement range is preferably from 10 μm to 10 mm, more preferably from 100 μm to 1 mm. If the range of measurement is too narrow, no accurate roughness may be computed. If the measurement range is too wide, measurement takes a long time, or corrugate or flatness is measured rather than roughness, which measurement is inadequate as the standard by which it is judged whether or not light transmittance is increased by liquid coating.

In the step of coating a liquid to one and opposed surfaces of a synthetic quartz glass block, the liquid should have a transmittance of at least 99.0%/mm, preferably at least 99.5%/mm, and more preferably at least 99.9%/mm at a birefringence measuring wavelength. If the liquid has a transmittance of less than 99.0%/mm, i.e., if the liquid contains dyes and foreign matter as impurities, or if the liquid material itself is absorptive, then the quantity of light reaching the light receiving section is reduced due to scattering, or the polarization state is disturbed upon passage through the liquid, failing to accurately measure a birefringence of a synthetic quartz glass block.

From the standpoint of acquisition of an accurate birefringence value, the difference between the birefringence of a liquid to be coated and the birefringence of a synthetic quartz glass block is preferably in a range of ±0.1 (i.e., −0.1 to +0.1), more preferably ±0.05 (i.e., −0.05 to +0.05).

Examples of the liquid to be coated include water; monohydric alcohols of 1 to 12 carbon atoms; polyhydric alcohols such as ethylene glycol, diethylene glycol, triethylene glycol, propylene glycol, 1,3-butylene glycol, tetramethylene glycol, glycerol, polyethylene glycol, and phenol; ethers such as dimethyl ether, methyl ethyl ether, diethyl ether, tetrahydrofuran, 2,5-dimethylfuran, benzofuran, and dibenzofuran; aldehydes such as acetaldehyde, propionaldehyde, and benzaldehyde; ketones such as acetone, methyl ethyl ketone, diethyl ketone, and cyclohexanone; carboxylic acids such as saturated fatty acids of 1 to 8 carbon atoms, oleic acid, linoleic acid and linolenic acid; hydrocarbons such as straight alkanes of 5 to 17 carbon atoms; and aqueous solutions thereof. These liquids are relatively easy to handle. Since these liquids are readily available as commercial reagents of guaranteed grade or purity, it is expectable that the liquid used is of consistent quality. When a quartz glass block is coated with such a liquid, the liquid coating has little or no impact on the birefringence of quartz glass or a consistent impact, which may be previously taken into account. Among others, preference is given to polyhydric alcohols having a molecular weight of at least 100, especially polyhydric alcohols having a molecular weight or weight average molecular weight (as measured versus polystyrene standards by gel permeation chromatography) of 200 to 2,000, because they have an appropriate viscosity to apply to rough surfaces of glass and are readily removed by washing with water. Since the polyhydric alcohols such as polymers having a high molecule weight have a high viscosity, they tend to remain on the glass surface after they are coated to the glass surface. For example, even when the light incident or emergent glass surface is on the lower side, the liquid coating maintains the surface wet. This ensures consistent measurement of a birefringence of a synthetic quartz glass block or sliced substrate.

The liquid to be coated should preferably have a vapor pressure at 20° C. of less than 2.3 kPa, more preferably less than 1.4 kPa, for the reason that if the surfaces of a glass block are dried during birefringence measurement, light transmission is inhibited and no accurate birefringence measurement is obtainable.

The liquid may be coated to one and opposed surfaces of a synthetic quartz glass block by any desired techniques such as brush coating, spray coating, and spin coating. The coating step is preferably as quick as possible and immediately followed by the birefringence measuring step, from the standpoint of preventing any failure of an accurate birefringence measurement by dry-out of the liquid.

Once the synthetic quartz glass block has been coated on its opposed surfaces with the liquid, a birefringence of the glass block is measured by directing light so as to enter one coated surface and emerge from the other coated surface. A birefringence may be measured by any desired techniques, for example, a Senarmont strain inspection system including a polarizer and an analyzer and utilizing an optical path difference between a sample and the analyzer, or a strain detector (LSM-4410LE by Luceo Co., Ltd.).

On birefringence measurement, it is desirable that measurement be made over a wider range in the measurement plane of a synthetic quartz glass block. When the synthetic quartz glass block is of large size and the movable range of the birefringence measuring system is short so that not all zones within the measurement plane can be covered by the system, measurement may be performed in a zone of about 10 mm wide on each of four sides of the measurement plane, and the maximum of four measurements be used as a standard for determining a slice thickness. Empirically, there is a tendency that a synthetic quartz glass block has a relatively high birefringence value at a position remote from its center and a relatively low birefringence value at a position near its center. Thus, for example, measurement may be performed in zones near 8 points including four corners of the measurement plane and mid-points of four sides, and the maximum of 8 measurements be used as a representative, based on which a slice thickness is determined.

Subsequently, on the basis of the maximum birefringence among measurements obtained by the birefringence measurement step, the slice thickness at which the glass block is sliced into substrates is determined.

There is a tendency that the warpage of a (sliced) synthetic quartz glass substrate resulting from slicing of a synthetic quartz glass block is larger as the birefringence of the glass block is greater and as the size of the sliced substrate is larger. Therefore, a polishing allowance necessary for the subsequent flattening step also varies with the birefringence of the original glass block and the size of the sliced substrate. Then an appropriate slice thickness for slice machining is predetermined at this stage.

In one embodiment, the synthetic quartz glass substrate into which the synthetic quartz glass block is sliced has dimensions of 300 mm to less than 900 mm×300 mm to less than 900 mm×α mm thickness. When the glass block has a birefringence measurement of 0 nm/cm to less than 30 nm/cm, the warpage of the substrate induced after slicing falls approximately within $0.02\alpha$, and so the slice thickness is set $(\alpha+0.02\alpha)$ to $(\alpha+0.04\alpha)$ mm, with an allowance for flattening step being taken into account. When the glass block has a birefringence measurement of 30 nm/cm to 50 nm/cm, the warpage of the substrate induced after slicing falls approximately within $0.03\alpha$, and so the slice thickness is set $(\alpha+0.03\alpha)$ to $(\alpha+0.05\alpha)$ mm.

In another embodiment, the glass substrate has dimensions of 900 mm to less than 1,800 mm×900 mm to less than 1,800 mm×α mm thickness. When the glass block has a birefringence measurement of 0 nm/cm to less than 20 nm/cm, the warpage of the substrate induced after slicing falls approximately within $0.02\alpha$, and so the slice thickness is set $(\alpha+0.02\alpha)$ to $(\alpha+0.04\alpha)$ mm, with an allowance for flattening step being taken into account. When the glass block has a birefringence measurement of 20 nm/cm to 40 nm/cm, the warpage of the substrate induced after slicing falls approximately within $0.03\alpha$, and so the slice thickness is set $(\alpha+0.03\alpha)$ to $(\alpha+0.05\alpha)$ mm.

Now that the slice thickness is determined as above, inconvenient problems in the subsequent step, such as a shortage of polishing allowance during flattening and thickness adjustment and inversely, introduction of an unnecessary polishing allowance are avoided. Thus the loss of the synthetic quartz glass block as stock material is saved.

Once the slice thickness is determined as above, the synthetic quartz glass block is sliced at the slice thickness into synthetic quartz glass substrates. The slicing technique may use any desired slicing machines such as a multi-wire saw with silicon carbide abrasive grains.

The synthetic quartz glass substrate as sliced is then subjected to the steps of grinding or lapping, rough polishing, and precision polishing, yielding a final synthetic quartz glass substrate. These polishing steps may be conventional steps as commonly employed in the art and finally yield a synthetic quartz glass substrate having a flatness variation of preferably up to 30 μm, more preferably up to 15 μm between the front and back surfaces.

EXAMPLE

Examples are given below for further illustrating the invention although the invention is not limited thereto.

Example 1

In order to produce a flat plate-shaped synthetic quartz glass substrate of dimensions (520 mm±0.3 mm)×(800 mm 0.3 mm)×(10.00 mm±0.2 mm), a synthetic quartz glass block having a quadrangular prism shape of 523 mm×803 mm×72.3 mm (width/length/thickness) and a surface roughness (Sa) of 1.5 μm was furnished as stock material.

All over two opposite surfaces (523 mm×803 mm) of the glass block, polyethylene glycol (Polyethylene glycol 400 by Wako Pure Chemicals Industries Ltd.) was uniformly coated using a brush so that light might enter one coated surface and emerge from the other coated surface. A birefringence at wavelength 540 nm on the coated surface was measured at four central positions of four sides by a strain detector LSM-4410LE (Luceo Co., Ltd.). It took about 5 minutes from the start of polyethylene glycol coating to the end of birefringence measurement. The maximum of birefringence measurements at four positions was 9.3 nm/cm.

On the basis of the birefringence measurement result, the slice thickness at which the glass block was to be sliced into glass substrates was determined to be 10.30 mm.

By using a multi-wire saw (Komatsu Engineering Co., Ltd.) with steel wires of diameter 0.32 mm, and a slurry containing silicon carbide abrasive grains and coolant, and operating the saw under conditions: a linear speed of 80 m/sec and a slicing speed of 5.0 mm/hr, the glass block was sliced into 7 plate-shaped quartz glass substrates having a thickness of 10.30 mm.

Each of 7 glass substrates thus obtained was cleaned before it was measured for flatness by a laser flatness meter (Kuroda Precision Industries Ltd.). The substrates had a flatness of 28 to 45 μm.

Each substrate was subjected to a lapping step, a rough polishing step using a double-side polishing machine, rigid urethane cloth and cerium oxide abrasive, and a final precision polishing step using a double-side polishing machine, suede abrasive cloth and colloidal silica abrasive, yielding a synthetic quartz glass substrate having precision mirror finish surfaces. Each substrate had a flatness of 3.5 to 8.7

μm. The polishing allowance needed in the polishing step was in a range of 140 to 195 μm relative to the thickness immediately after slicing.

Seven synthetic quartz glass substrates thus obtained had a thickness from 10.10 mm to less than 10.14 mm. That is, all thickness values fell within the desired thickness range: 10.00 mm±0.2 mm.

It is evident from these results that once an appropriate thickness for slicing of a glass block is determined, an extra polishing allowance for thickness adjustment in case of too thick slicing is eliminated or inversely, a risk of a final glass substrate failing to meet the desired thickness as a result of too thin slicing is avoided.

Example 2

A synthetic quartz glass block of the same dimensions as in Example 1 was furnished. As in Example 1, polyethylene glycol (Polyethylene glycol 400) was uniformly coated on two opposite surfaces (523 mm×803 mm) of the glass block. A birefringence on the coated surface was measured at four central positions of four sides. The maximum of birefringence measurements at four positions was 41.2 nm/cm. It took about 5 minutes from the start of polyethylene glycol coating to the end of birefringence measurement.

On the basis of the birefringence measurement result, the slice thickness at which the glass block was to be sliced into glass substrates was determined to be 10.40 mm.

Under the same conditions as in Example 1, the glass block was sliced into 6 plate-shaped quartz glass substrates having a thickness of 10.40 mm. The substrates were cleaned and measured for flatness as in Example 1, finding a flatness of 104 to 183 μm.

Thereafter, through the same polishing steps as in Example 1, 6 synthetic quartz glass substrate having precision mirror finish surfaces were obtained. These substrates had a flatness of 3.4 to 8.9 μm. The polishing allowance of glass substrate needed in the polishing step was in a range of 290 to 375 μm relative to the thickness immediately after slicing.

Six synthetic quartz glass substrates thus obtained had a thickness from 10.02 mm to less than 10.10 mm. That is, all thickness values fell within the desired thickness range: 10.00 mm±0.2 mm.

In this Example, the birefringence of the glass block was greater than that of Example 1, and the slice thickness was accordingly increased. Thus six glass substrates resulted from slicing. A risk of a final glass substrate failing to meet the desired thickness as a result of too thin slicing is avoided.

Example 3

In order to produce a flat plate-shaped synthetic quartz glass substrate of dimensions (1220 mm±0.3 mm)×(1400 mm±0.3 mm)×(13.00 mm±0.2 mm), a synthetic quartz glass block having a quadrangular prism shape of 1223 mm×1403 mm×80.5 mm (width/length/thickness) and a surface roughness (Sa) of 1.5 μm was furnished as stock material.

As in Example 1, polyethylene glycol (Polyethylene glycol 400) was uniformly coated on two opposite surfaces (1223 mm×1403 mm) of the glass block. A birefringence on the coated surface was measured at four central positions of four sides. The maximum of birefringence measurements at four positions was 9.5 nm/cm. It took about 5 minutes from the start of polyethylene glycol coating to the end of birefringence measurement.

On the basis of the birefringence measurement result, the slice thickness at which the glass block was to be sliced into glass substrates was determined to be 13.35 mm.

Under the same conditions as in Example 1, the glass block was sliced into 7 plate-shaped quartz glass substrates having a thickness of 13.35 mm. The substrates were cleaned and measured for flatness as in Example 1, finding a flatness of 50 to 116 μm.

Thereafter, through the same polishing steps as in Example 1, 7 synthetic quartz glass substrate having precision mirror finish surfaces were obtained. These substrates had a flatness of 4.6 to 9.1 μm. The polishing allowance of glass substrate needed in the polishing step was in a range of 241 to 314 μm relative to the thickness immediately after slicing.

Seven synthetic quartz glass substrates thus obtained had a thickness from 13.03 mm to less than 13.10 mm. That is, all thickness values fell within the desired thickness range: 13.00 mm±0.2 mm.

It is evident from these results that once an appropriate thickness for slicing of a glass block is determined, an extra polishing allowance for thickness adjustment in case of too thick slicing is eliminated or inversely, a risk of a final glass substrate failing to meet the desired thickness as a result of too thin slicing is avoided.

Example 4

A synthetic quartz glass block of the same dimensions as in Example 3 was furnished. As in Example 1, polyethylene glycol (Polyethylene glycol 400) was uniformly coated on two opposite surfaces (1223 mm×1403 mm) of the glass block. A birefringence on the coated surface was measured at four central positions of four sides. The maximum of birefringence measurements at four positions was 34.5 nm/cm. It took about 5 minutes from the start of polyethylene glycol coating to the end of birefringence measurement.

On the basis of the birefringence measurement result, the slice thickness at which the glass block was to be sliced into glass substrates was determined to be 13.50 mm.

Under the same conditions as in Example 1, the glass block was sliced into 5 plate-shaped quartz glass substrates having a thickness of 13.50 mm. The substrates were cleaned and measured for flatness as in Example 1, finding a flatness of 168 to 284 μm.

Thereafter, through the same polishing steps as in Example 1, 5 synthetic quartz glass substrate having precision mirror finish surfaces were obtained. These substrates had a flatness of 3.0 to 8.4 μm. The polishing allowance of glass substrate needed in the polishing step was in a range of 400 to 680 μm relative to the thickness immediately after slicing.

Five synthetic quartz glass substrates thus obtained had a thickness from 12.82 mm to less than 13.10 mm. That is, all thickness values fell within the desired thickness range: 13.00 mm±0.2 mm.

In this Example, the birefringence of the glass block was greater than that of Example 3, and the slice thickness was accordingly increased. Thus five glass substrates resulted from slicing. A risk of a final glass substrate failing to meet the desired thickness as a result of too thin slicing is avoided.

Comparative Example 1

A synthetic quartz glass block of the same dimensions as in Example 1 was furnished. On the basis of an average of conventional polishing allowances allotted to plate-shaped synthetic quartz glass substrates of the same dimensions, the slice thickness was determined to be 10.35 mm. Under the same conditions as in Example 1, the glass block was sliced into 6 plate-shaped synthetic quartz glass substrates having a thickness of 10.35 mm. The substrates were cleaned and measured for flatness as in Example 1, finding a flatness of 25 to 47 µm.

Thereafter, through the same polishing steps as in Example 1, 6 synthetic quartz glass substrate having precision mirror finish surfaces were obtained. These substrates had a flatness of 3.2 to 8.8 µm. The polishing allowance of glass substrate needed in the polishing step was in a range of 163 to 200 µm relative to the thickness immediately after slicing.

Six synthetic quartz glass substrates thus obtained had a thickness from 10.16 mm to less than 10.19 mm. That is, all thickness values fell within the desired thickness range: 10.00 mm±0.2 mm.

In Comparative Example 1, six plate-shaped synthetic quartz glass substrates were obtained from a synthetic quartz glass block having a thickness of 72.3 mm. It is evident from the results that a polishing allowance of about 200 µm is sufficient for the substrate flatness to fall within 10 µm or less. The substrates thus obtained had a margin of at least 150 µm. When the slice thickness was set 10.30 mm, seven glass substrates could be obtained, whose thickness did not fall outside the desired thickness range. Then the setting of Comparative Example 1 means a loss of one glass substrate.

Comparative Example 2

A synthetic quartz glass block of the same dimensions as in Example 1 was furnished. On the basis of an average of conventional polishing allowances allotted to plate-shaped synthetic quartz glass substrates of the same dimensions, the slice thickness was determined to be 10.35 mm. Under the same conditions as in Example 1, the glass block was sliced into 6 plate-shaped synthetic quartz glass substrates having a thickness of 10.35 mm. The substrates were cleaned and measured for flatness as in Example 1, finding a flatness of 182 to 242 µm.

Thereafter, through the same polishing steps as in Example 1, 6 synthetic quartz glass substrate having precision mirror finish surfaces were obtained. These substrates had a flatness of 3.2 to 7.9 µm. The polishing allowance of glass substrate needed in the polishing step was in a range of 326 to 570 µm relative to the thickness immediately after slicing.

Six synthetic quartz glass substrates thus obtained had a thickness from 9.78 mm to less than 10.02 mm. Although five of six substrates had a thickness within the desired thickness range: 10.00 mm±0.2 mm, one substrate was off-specification because of a thickness below the desired thickness.

In Comparative Example 2, five plate-shaped synthetic quartz glass substrates were obtained from a synthetic quartz glass block having a thickness of 72.3 mm. It is evident from the results that a polishing allowance of about 570 µm at maximum was necessary for the substrate flatness to fall within 10 µm or less. It is believed that if the slice thickness was set 10.40 mm, all glass substrates could have a thickness falling within the desired thickness range.

Comparative Example 3

A synthetic quartz glass block of the same dimensions as in Example 3 was furnished. On the basis of an average of conventional polishing allowances allotted to plate-shaped synthetic quartz glass substrates of the same dimensions, the slice thickness was determined to be 13.45 mm. Under the same conditions as in Example 1, the glass block was sliced into 5 plate-shaped synthetic quartz glass substrates having a thickness of 13.45 mm. The substrates were cleaned and measured for flatness as in Example 1, finding a flatness of 79 to 108 µm.

Thereafter, through the same polishing steps as in Example 1, 5 synthetic quartz glass substrate having precision mirror finish surfaces were obtained. These substrates had a flatness of 4.5 to 9.6 µm. The polishing allowance of glass substrate needed in the polishing step was in a range of 273 to 300 µm relative to the thickness immediately after slicing.

Five synthetic quartz glass substrates thus obtained had a thickness from 13.15 mm to less than 13.18 mm. That is, all thickness values fell within the desired thickness range: 13.00 mm±0.2 mm.

In Comparative Example 3, five plate-shaped synthetic quartz glass substrates were obtained from a synthetic quartz glass block having a thickness of 80.5 mm. It is evident from the results that a polishing allowance of about 300 µm is sufficient for the substrate flatness to fall within 10 µm or less. The substrates thus obtained had a margin of at least 150 µm. When the slice thickness was set 13.35 mm, six glass substrates could be obtained, whose thickness did not fall outside the desired thickness range. Then the setting of Comparative Example 3 means a loss of one glass substrate.

Comparative Example 4

A synthetic quartz glass block of the same dimensions as in Example 4 was furnished. On the basis of an average of conventional polishing allowances allotted to plate-shaped synthetic quartz glass substrates of the same dimensions, the slice thickness was determined to be 13.45 mm. Under the same conditions as in Example 1, the glass block was sliced into 5 plate-shaped synthetic quartz glass substrates having a thickness of 13.45 mm. The substrates were cleaned and measured for flatness as in Example 1, finding a flatness of 206 to 276 µm.

Thereafter, through the same polishing steps as in Example 1, 5 synthetic quartz glass substrate having precision mirror finish surfaces were obtained. These substrates had a flatness of 3.9 to 8.7 µm. The polishing allowance of glass substrate needed in the polishing step was in a range of 408 to 660 µm relative to the thickness immediately after slicing.

Five synthetic quartz glass substrates thus obtained had a thickness from 12.79 mm to less than 13.05 mm. Although three of five glass substrates had a thickness within the desired thickness range: 13.00 mm±0.2 mm, two substrates were off-specification because of a thickness below the desired thickness.

In Comparative Example 4, three plate-shaped synthetic quartz glass substrates were obtained from a synthetic quartz glass block having a thickness of 80.5 mm. It is evident from the results that a polishing allowance of about 660 µm at maximum was necessary for the substrate flatness to fall within 10 µm or less. It is believed that if the slice thickness was set 13.50 mm, all glass substrates could have a thickness falling within the desired thickness range.

Japanese Patent Application No. 2016-045211 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a synthetic quartz glass substrate, comprising the steps of:
    furnishing a synthetic quartz glass block to be sliced into synthetic quartz glass substrates, the glass block having six surfaces including a surface parallel to a slicing plane and a surface opposed thereto,
    coating two surfaces consisting of the surface parallel to the slicing plane and the surface opposed thereto of the glass block with a liquid having a transmittance of at least 99.0%/mm at a birefringence measuring wavelength,
    measuring a birefringence of the glass block by directing light so as to enter one coated surface and emerge from the other coated surface,
    determining a slice thickness to which the glass block is sliced, on the basis of the birefringence measurement and the dimensions of the substrate, and
    slicing the glass block at the determined slice thickness into synthetic quartz glass substrates.

2. The method of claim 1 wherein the dimensions of the substrate are 300 mm to less than 900 mm×300 mm to less than 900 mm×α mm thickness,
    when the glass block has a birefringence measurement of 0 nm/cm to less than 30 nm/cm, the slice thickness is set $(\alpha+0.02\alpha)$ to $(\alpha+0.04\alpha)$ mm, and when the glass block has a birefringence measurement of 30 nm/cm to 50 nm/cm, the slice thickness is set $(\alpha+0.03\alpha)$ to $(\alpha+0.05\alpha)$ mm.

3. The method of claim 1 wherein the dimensions of the substrate are 900 mm to less than 1,800 mm×900 mm to less than 1,800 mm×α mm thickness,
    when the glass block has a birefringence measurement of 0 nm/cm to less than 20 nm/cm, the slice thickness is set $(\alpha+0.02\alpha)$ to $(\alpha+0.04\alpha)$ mm, and when the glass block has a birefringence measurement of 20 nm/cm to 40 nm/cm, the slice thickness is set $(\alpha+0.03\alpha)$ to $(\alpha+0.05a)$ mm.

4. The method of claim 1, further comprising, after the slicing step, the steps of grinding or lapping, rough polishing, and precision polishing the synthetic quartz glass substrates.

5. The method of claim 1 wherein the coating step is conducted by at least one method of brush coating, spray coating, and spin coating.

6. A method for preparing a synthetic quartz glass substrate, comprising the steps of:
    furnishing a synthetic quartz glass block to be sliced into synthetic quartz glass substrates, the glass block having a surface parallel to a slicing plane and a surface opposed thereto,
    applying a liquid having a transmittance of at least 99.0%/mm at a birefringence measuring wavelength to only the surface parallel to the slicing plane and the surface opposed thereto of the glass block, so that only the two surfaces of the surface parallel to the slicing plane and the surface opposed thereto of the glass block are coated with the liquid;
    measuring a birefringence of the glass block by directing light so as to enter one coated surface and emerge from the other coated surface,
    determining a slice thickness to which the glass block is sliced, on the basis of the birefringence measurement and the dimensions of the substrate, and
    slicing the glass block at the determined slice thickness into synthetic quartz glass substrates.

7. The method of claim 6 wherein the synthetic quartz glass block has six surfaces including the surface parallel to the slicing plane and the surface opposed thereto.

* * * * *